A. McWHORTER.
POTATO PLANTER.
APPLICATION FILED JULY 2, 1908.

925,826.

Patented June 22, 1909.
7 SHEETS—SHEET 1.

A. McWHORTER.
POTATO PLANTER.
APPLICATION FILED JULY 2, 1908.

925,826.

Patented June 22, 1909.
7 SHEETS—SHEET 3.

Witnesses
H. S. Dieterich
P. F. Nagle

Inventor
Allen McWhorter
Wiedersheim & Fairbanks
Attorneys

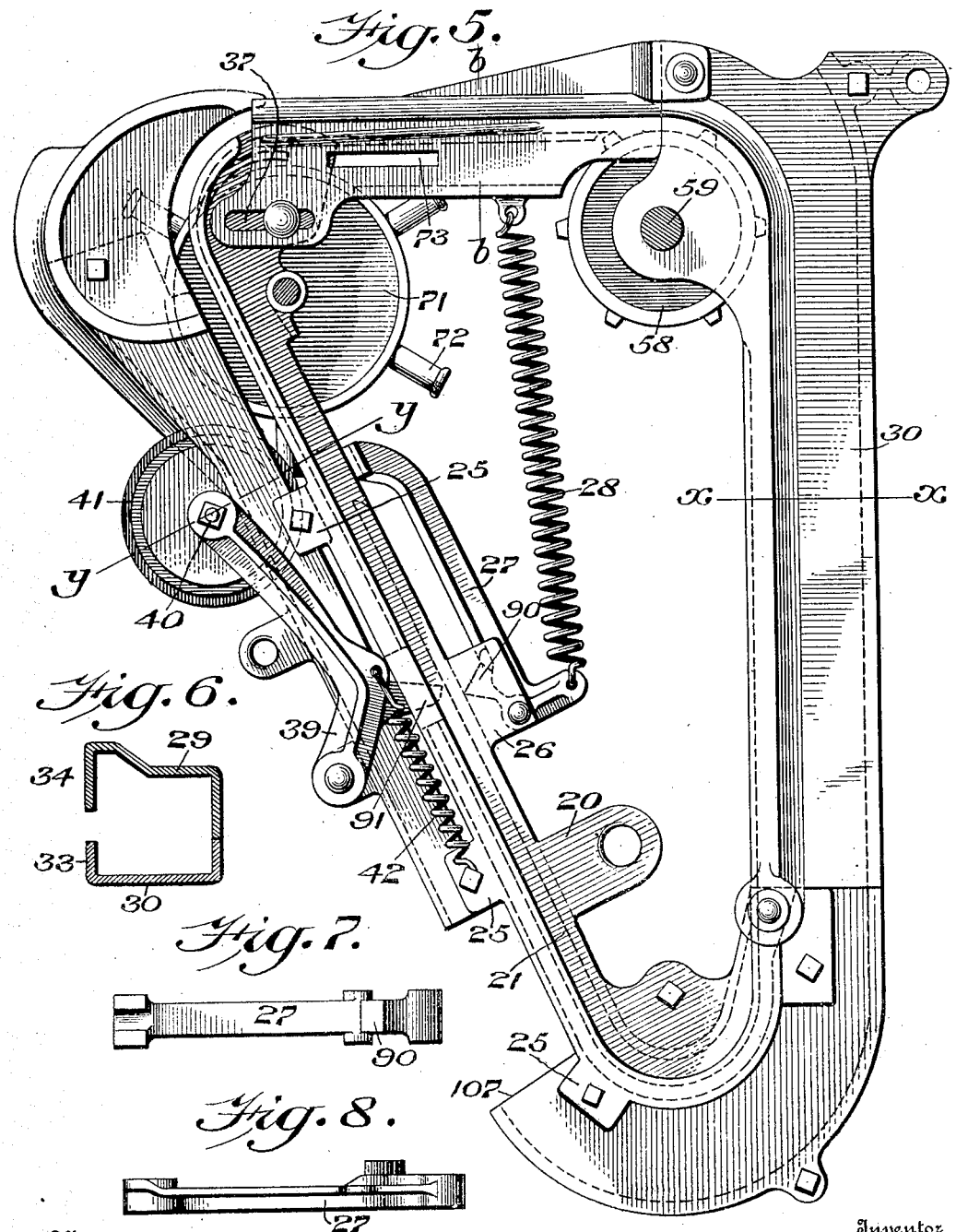

A. McWHORTER.
POTATO PLANTER.
APPLICATION FILED JULY 2, 1908.

925,826.

Patented June 22, 1909.
7 SHEETS—SHEET 5.

Witnesses
H. G. Dieterich
P. F. Nagle

Inventor
Allen McWhorter.
By Wiedersheim & Fairbanks.
Attorneys

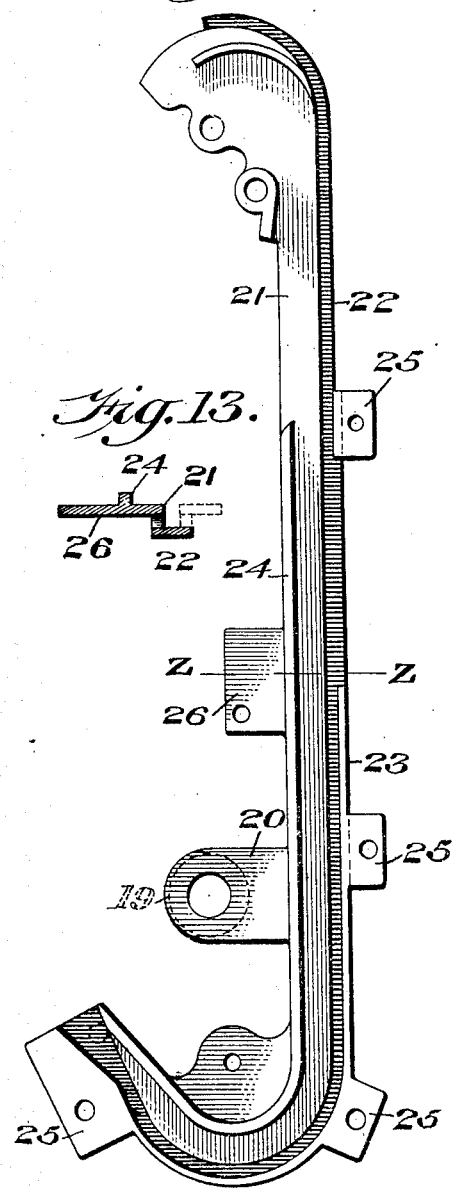

A. McWHORTER.
POTATO PLANTER.
APPLICATION FILED JULY 2, 1908.
925,826.
Patented June 22, 1909.
7 SHEETS—SHEET 7.
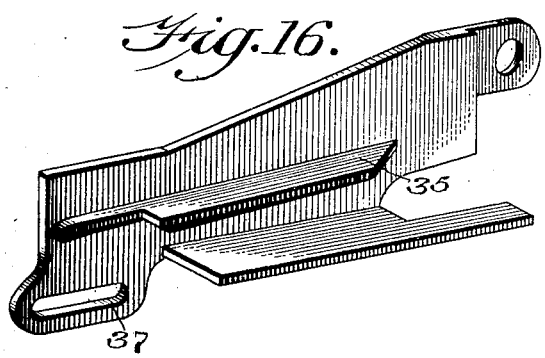
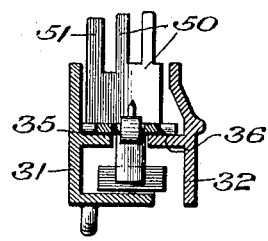
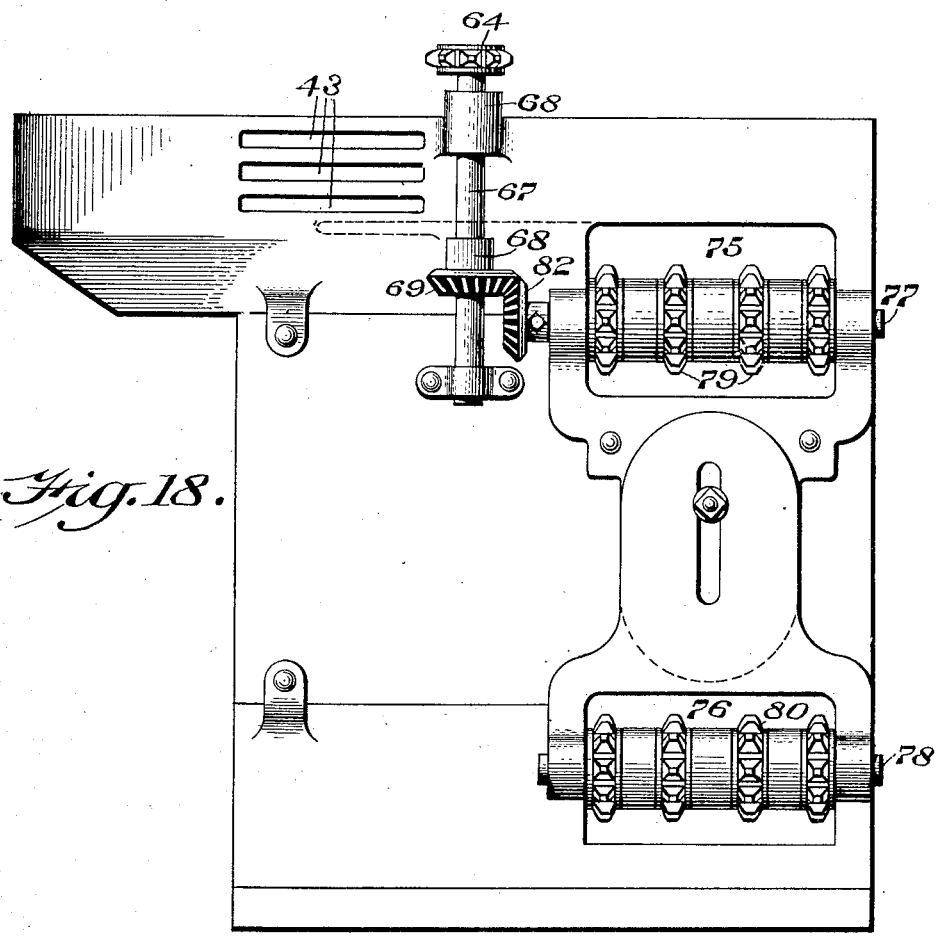
Witnesses
Inventor
Allen McWhorter.
By Wiedersheim & Fairbanks
Attorneys

UNITED STATES PATENT OFFICE.

ALLEN McWHORTER, OF RIVERTON, NEW JERSEY.

POTATO-PLANTER.

No. 925,826.  Specification of Letters Patent.  Patented June 22, 1909.

Application filed July 2, 1908. Serial No. 441,599.

*To all whom it may concern:*

Be it known that I, ALLEN McWHORTER, a citizen of the United States, residing in the city of Riverton, county of Burlington, and State of New Jersey, have invented a new and useful Potato-Planter, of which the following is a specification.

This invention relates to a new and useful potato planter and consists of a vehicle carrying a hopper adapted to contain seed potatoes and which has located adjacent thereto a means for removing from the hopper the seed potatoes and depositing them one at a time from a device in close proximity to a furrow made in the ground by a portion of the machine provided for that purpose.

It further consists of a hopper having a carrier located therein for the purpose of delivering seed potatoes to a conveyer mechanism located adjacent the hopper and which automatically conveys the potatoes one at a time to a discharge opening from which they are properly expelled.

It further consists of a conveyer formed of a plurality of buckets detachably secured together, each bucket having thereon a means for engaging a potato and maintaining the same in proper position upon the bucket, which means is automatically operated in its movement to engage and release a potato.

It further consists of a driving mechanism for operating a conveyer and which also has coöperating therewith a device adapted to agitate the potatoes in the hopper, whereby clogging of portions of the apparatus is prevented.

It further consists of a novel means of disconnecting the driving mechanism from the operating parts of the planter whenever it is desired to cease the planting operation.

It further consists of other novel features of construction, all as will be hereinafter fully set forth.

Figure 1:
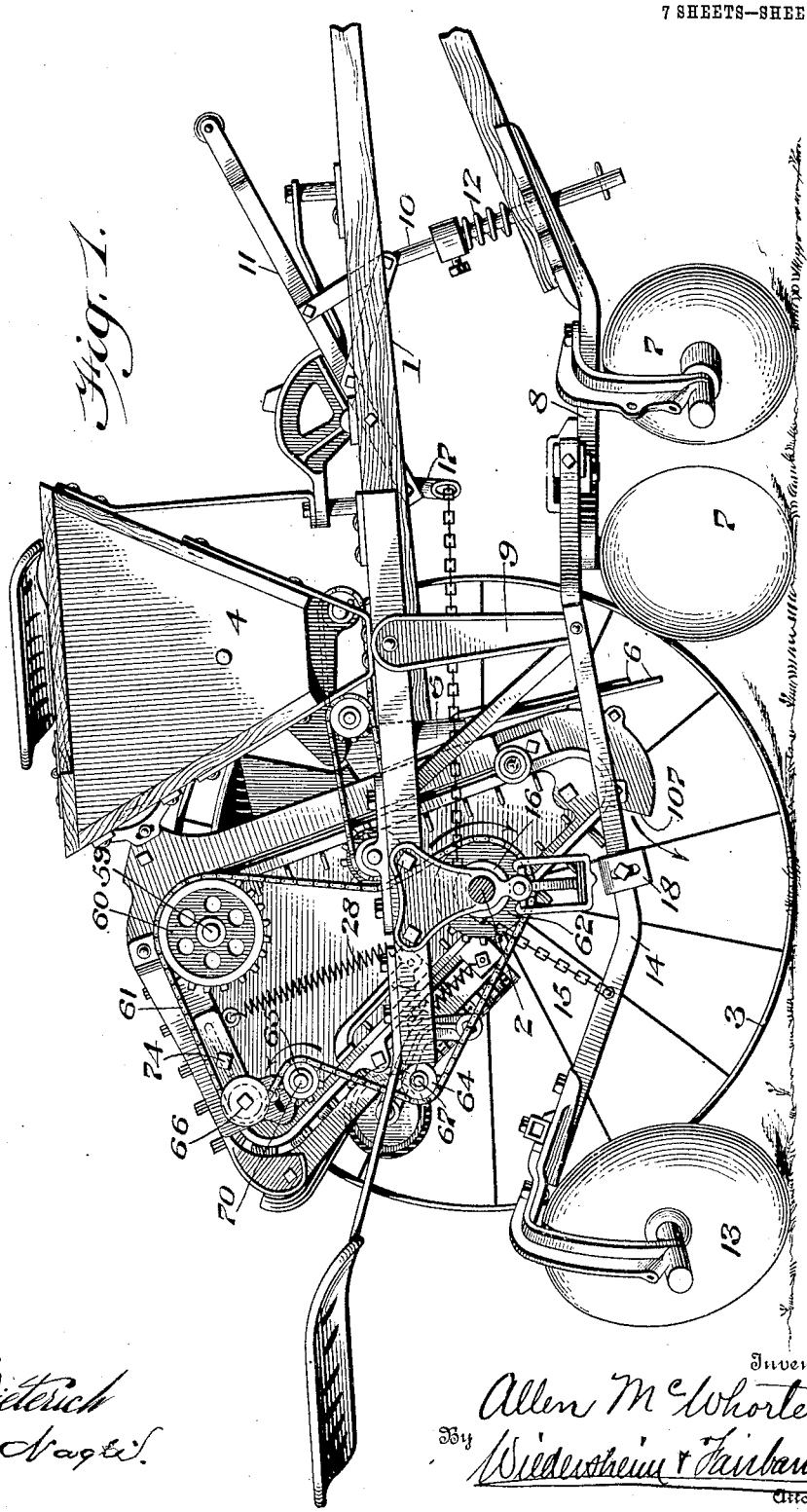
Figure 2:
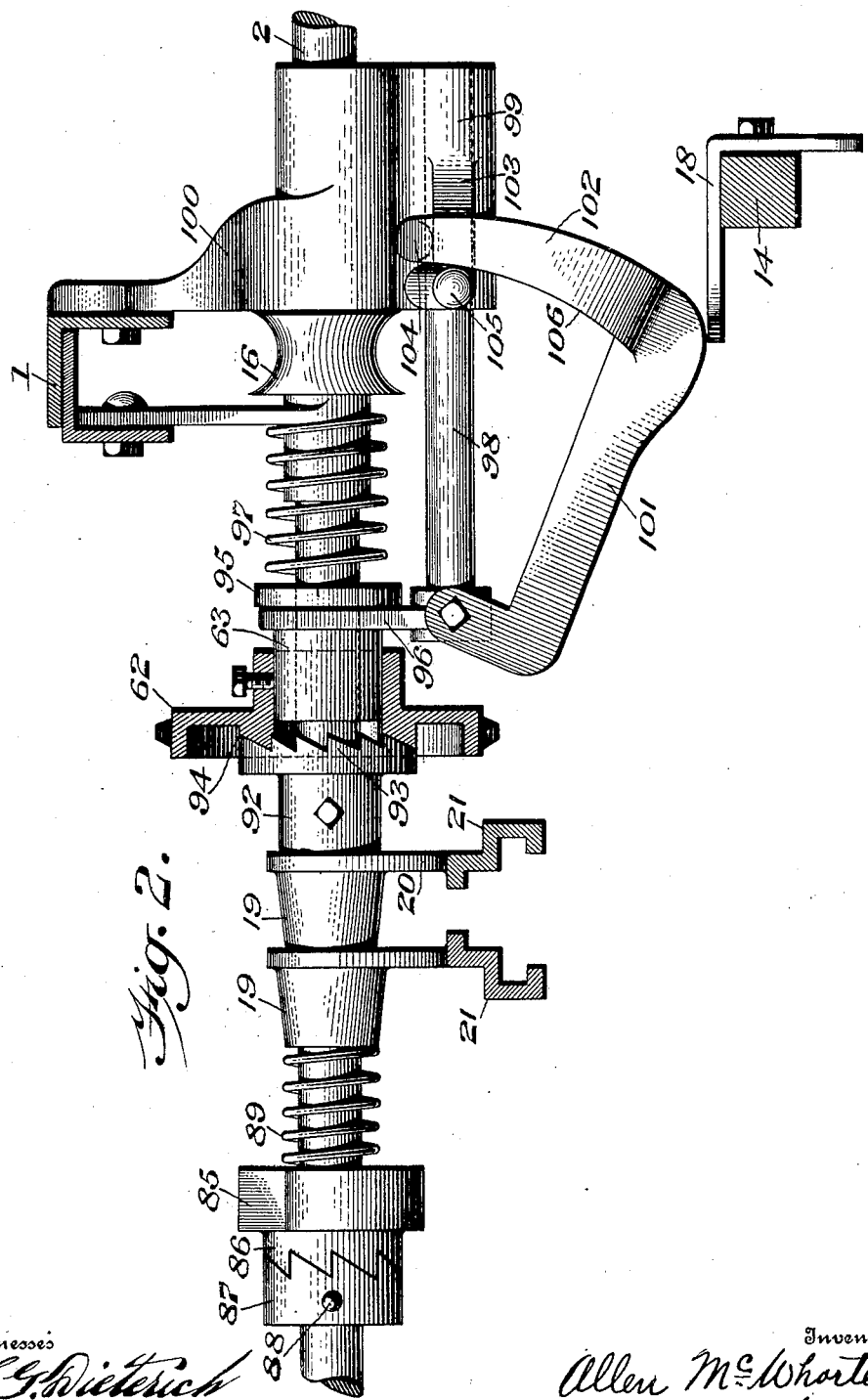
Figure 3:
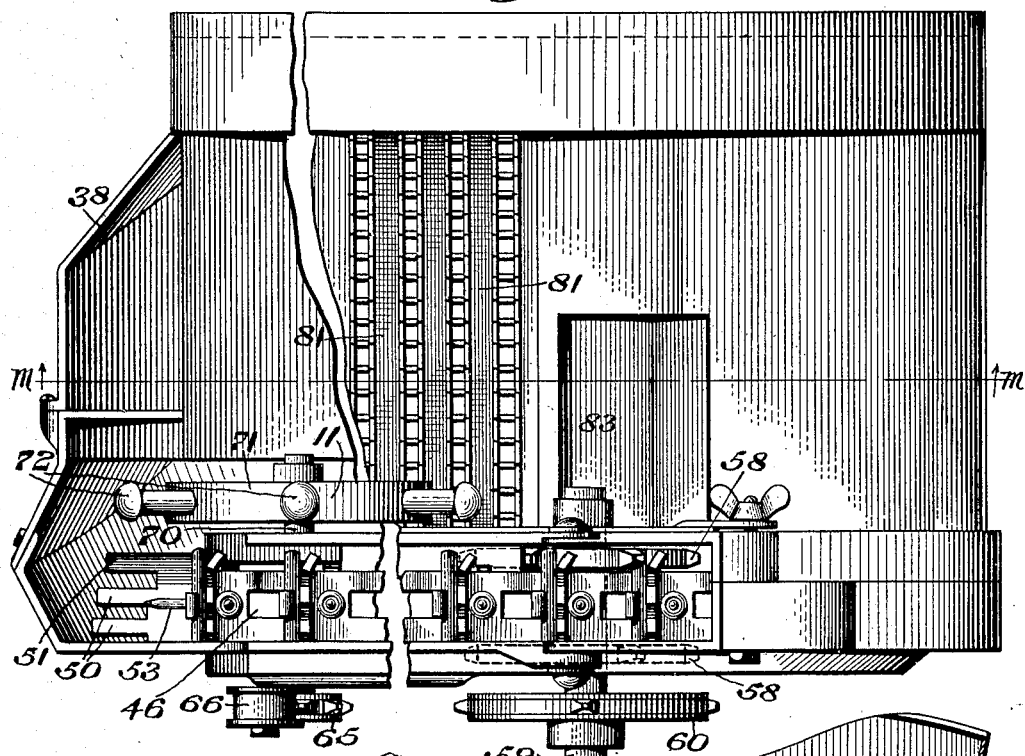
Figure 4:
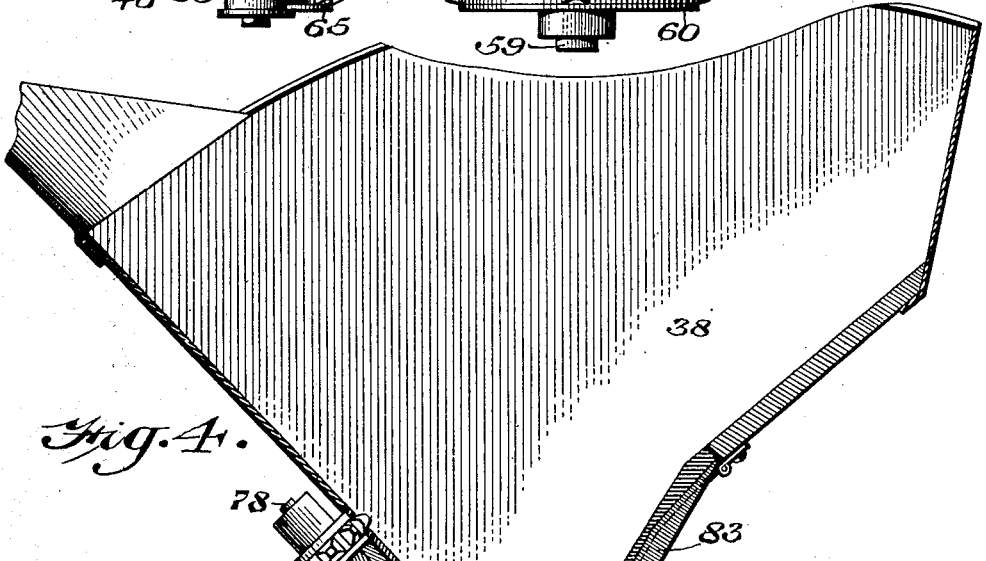
Figure 9:
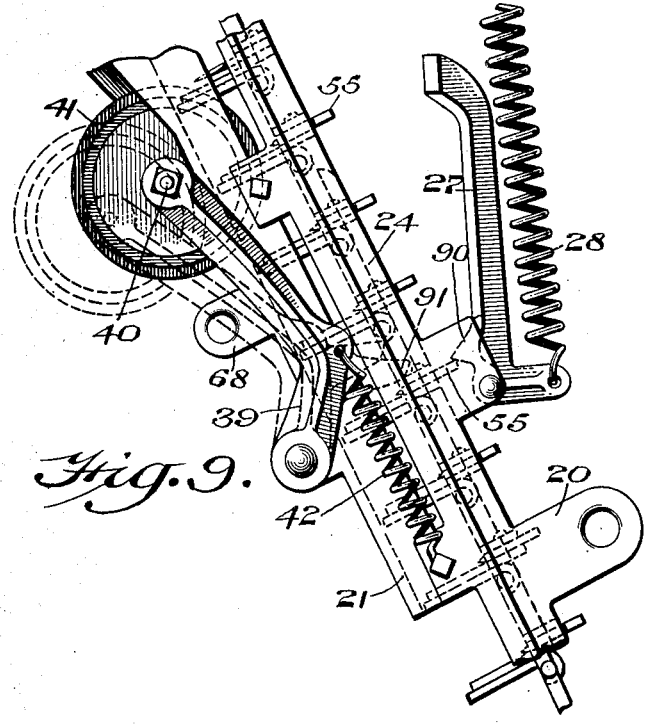
Figure 10:
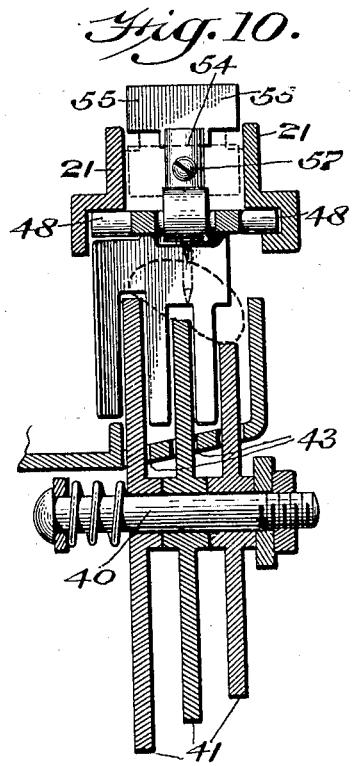
Figure 11:
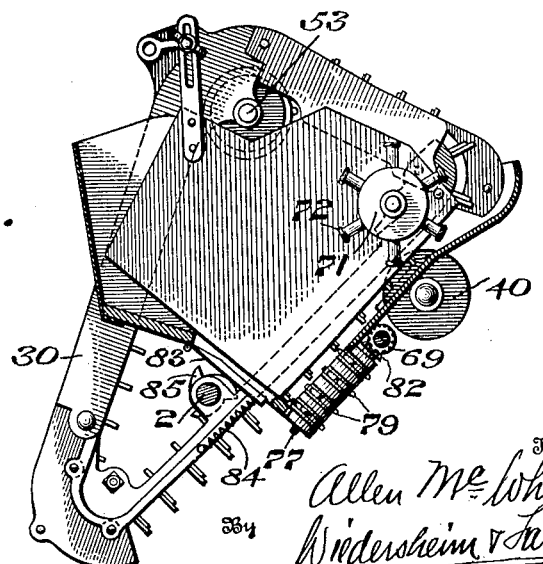

Figure 1 represents a side elevation of a machine embodying my invention, certain portions being broken away. Fig. 2 represents the main driving shaft and the clutch mechanism. Fig. 3 represents a plan view of the hopper mechanism. Fig. 4 represents a section on line *m—m*, Fig. 3, in the direction of the arrows. Fig. 5 represents a side elevation of the conveyer run-way. Fig. 6 represents a section on line *x—x*, Fig. 5. Fig. 7 represents a bottom plan view of the hammer mechanism. Fig. 8 represents a top plan view of the same. Fig. 9 represents a side elevation of the impaling mechanism. Fig. 10 represents a section on line *y—y*, Fig. 5. Fig. 11 represents a section on line *m—m*, Fig. 3, in an opposite direction to the arrows indicated. Fig. 12 represents a detail of the conveyer run-way showing the guide way. Fig. 13 represents a section on line *z—z*, Fig. 12. Fig. 14 represents an elevation of one of the conveyer buckets. Fig. 15 represents a section on line *a—a*, Fig. 14. Fig. 16 represents a perspective of a conveyer guide. Fig. 17 represents a section on line *b—b*, Fig. 5. Fig. 18 represents one side of the hopper showing the feeding mechanism.

Similar numerals of reference indicate corresponding parts in the figures.

Referring to the drawings:—For the purpose of illustrating my invention, I have shown in the accompanying drawings those embodiments which will give reliable and satisfactory results in practice, although it is to be understood that the various instrumentalities of which my invention consists can be variously arranged and organized and that my invention is not limited to the precise arrangement and organization of these instrumentalities as herein shown.

1 designates the frame of a planting machine embodying my invention, the same being suitably mounted on the axle or shaft 2 which is supported on the usual vehicle wheels 3. The frame 1 supports a hopper 4 adapted to contain a fertilizer and communicating with a discharge funnel 5 which leads the same to the pipes 6 which are positioned so as to deposit the fertilizer in the furrows cut by the disk furrowers 7. These disk furrowers 7 are rotatably mounted on a frame 8 pivoted at one end to a hanger 9 secured to the main frame 1, while at the other end, the frame 8 is adjustably supported by a rod 10 connected to a manually operated lever 11 which is pivotally connected with the frame 1. A yielding connection 12 is preferably formed between the frame 8 and the connecting rod 10 so that shocks to the frame caused by irregularities in the ground will be practically absorbed thereby. The function of these disks 7 is to scoop out a furrow of some depth as the planting machine is drawn over the field, the disks 7 having a convex surface and are mounted so as to be on an incline. The furrow thus formed, receives the seed potatoes, which as soon as they are dropped from the machine, are covered by a disk coverer 13 similar to the disk 7 and mounted on a pivoted extension 14 to the hanger 9. A chain 15 is connected to the extension 14 and passes over a guide wheel 16, loosely mounted on the shaft 2 and is connected with an arm 17 attached to the pivoted lever 11.

It will be clear that as the lever 11 is shifted, both sets of disks may be raised or lowered as the case may be, from contact with the ground to perform their functions. The extension member 14 carries thereon a trip member 18 adapted to engage, when raised, a clutch mechanism, to be hereinafter described.

19 designates a pair of sleeves loosely mounted upon the shaft 2 and each of which is preferably formed integral with a lug 20 carrying a side member 21 which latter form a portion of a run-way for the conveyer. As these side members 21 are duplicates of one another, a description of one will suffice for both. One of the members 21 is disclosed in detail in Fig. 12, wherein 22 designates a channel or groove for the conveyer mechanism, the same having for a portion of its length a guide 23 for the purpose of maintaining the conveyer in the channel 22. 24 designates a similar guide member on the opposite side of the member 21, the function of which will be hereinafter described. Brackets 25 are formed at suitable locations on the side member 21, whereby the same may be bolted or otherwise secured to the adjacent parts.

26 designates a bracket adapted to pivotally support a hammer 27 normally held as illustrated in Fig. 5, by a spring 28 secured to a suitable portion of the frame. Secured to the members 21 are two side channel members 29 and 30 see Figs. 5 and 6, and also top members 31 and 32 see Fig. 17 which are connected with the side channel members 29 and 30, whereby a complete run-way for the conveyer is formed. It will be noted that it is not absolutely necessary to provide flanges or recesses in the members 29 and 30 to form guide ways for the conveyer chain, since this portion of the run-way is normally inclined so that the inturned edges 33 and 34 of said members form of themselves a support for the conveyer. The edges 33 and 34 approach, sufficiently close to provide a slot throughout the length thereof. The top side members 31 and 32 are provided with a slotted lug 37 to allow adjustment with the side member 21.

It will be clear that a complete and endless run way has been provided for a conveyer chain, the same being inclosed for a portion of its length and the remaining portion having an open side to accommodate coöperating devices. The conveyer run way is adjacent to a hopper 38 preferably made up in sections and serving as a receptacle for the seed potatoes, from which they are delivered to the conveyer. Pivotally secured to a suitable part of the shell of the hopper is an arm 39 and carrying a shaft 40 on which are rotatably mounted the disks 41 preferably of different diameters in order that the seed potatoes may be properly positioned on the surface thereof. The arm 39 is held in normal position by means of a spring 42 suitably secured to the frame and in order that the disks 41 may have freedom of movement the hopper shell is slotted at 43 to allow the disks to readily pass therethrough.

The conveyer chain is made up of a plurality of buckets or link members 44, each consisting of a body portion 45 having a slot 46 therein, one side of which is formed of a bar 47 having extensions 48 thereon which project sufficiently beyond the body portion 45 to be engaged by the driving sprockets. A hook 49 projects from the body portion and is provided to coöperate with the bar 47 in the adjacent bucket, whereby when a number of buckets are thus secured together they form a continuous series of interlocking detachable members comprising a conveyer chain. A plurality of fingers 50 project from the body portion of the bucket so as to form a carrier shelf for the potatoes and also make provision for the interfitting therewith of the disks 41 at the proper portion of the travel of the conveyer.

It will be noted that one of the fingers at 51 projects latterly beyond the body portion 45 and is inclined with respect to the other fingers, to correspond to the graded disks 41 in order that the potato may be correctly positioned in line with a socket 52 formed in the body portion of the bucket to receive an impaling member 53. This impaler 53 preferably consists of a sharp punch mounted on a slide 54, having side wings 55 and a cut away portion forming a shoulder 56, which is engaged by a set screw or stop 57 to prevent improper movement of the impaling punch. When the conveyer chain has been assembled and placed in position within the run way, it will be seen that the extensions 48 fit in the run way 22 whereby the chain is maintained in proper relation throughout the path of movement.

It will be clear that when the conveyer chain is properly positioned the extended wings 55 will be engaged by the guide edges 33 and 34 at the proper time and thereby maintain the impaler in retracted position during a portion of the travel of the chain. The driving means for the conveyer chain consists of sprockets 58, see Fig. 3, suitably mounted on the shaft 59 so that the teeth thereon will engage the extensions 48 on the bar 47 and thereby properly propel the chain in its course through the run way in order to actuate the sprockets 58. A driven sprocket 60 is also mounted on the shaft 59 and carries thereon a chain 61 which passes around a driving sprocket 62 mounted on a sleeve 63 upon the main vehicle shaft 2 and also passes over the sprockets 64 and 65, an idler member 66 being interposed at a suitable point in its circuit to adjust the same. The sprocket 64 is mounted for rotation on a shaft 67 journaled in hangers 68 see Fig. 18 mounted on a portion of the hopper frame, which shaft 67 also carries a bevel gear 69 for a purpose to be hereinafter described. The sprocket 65 is suitably supported on a shaft 70 mounted in bearings provided in the hopper frame, and carrying thereon a disk 71 provided with radially extended arms 72 which as they rotate pass adjacent to the conveyer chain. This disk 71 is positioned at a point in the travel of the conveyer chain preferably near the top of the hopper so that any superfluous potatoes which are improperly carried up by the conveyer are shaken off as it makes a turn and will be immediately engaged by the rotating arms 72 and whirled back into the hopper.

It will of course be understood in regard to the idler 66, that the same may be adjusted to tighten or loosen the driving chain as the case may be, such adjusting means in the present instance consisting of a slot 73 formed in the conveyer frame and a securing bolt 74. One side of the hopper, illustrated in Fig. 18, is made up of sections forming apertures 75 and 76 adapted to receive shafts 77 and 78 suitably journaled in the frame and carrying a plurality of sprockets 79 and 80, the respective sprockets in each aperture being in alinement with those in the other, whereby a moving chain conveyer 81 is formed at approximately the bottom of the hopper, said chain being suitably positioned to deliver the potatoes properly to the conveyer. This chain 81 is driven in any desired manner and as herein shown, the shaft 77 carries on the end thereof a bevel gear 82 meshing with a similar gear 69 mounted as hereinbefore described. Adjacent the conveyer chain 81 see Fig. 4 a section of the hopper is cut away to form an opening in which is pivoted a plate 83 adapted to be normally held slightly away from the bottom of the hopper in the present instance by a spring 84 serving that purpose. This plate 83 is adapted to be struck by a cam 85 mounted for rotation on the main shaft 2 and in the preferred construction this cam has formed integral therewith a hub 86 see Fig. 2 provided with teeth which interfit and engage corresponding teeth on a sleeve member 87 secured to the shaft 2 by set screw means 88. The hub 86 of the cam 85 is normally maintained in mesh with the member 87 by means of a spring 89 suitably mounted on the shaft 2. It will be seen therefore that as the main shaft 2 is rotated, the movement thereof is communicated by the sleeve 87 which in turn through the teeth connection rotates the cam member 85. By means of this yielding clutch mechanism it will be apparent that should the shaft be turned in a reverse direction the clutch will be thrown out of engagement as one side of the teeth is sufficiently inclined for this purpose. The function of the cam 85 is to strike at intervals the plate 83 and force the same inwardly against the tension of the spring 84 so as to keep the same in a state of vibration in order to prevent clogging of the potatoes and direct the same to the chain 81. It is by this means that the potatoes in the hopper are constantly kept moving so that there is practically no chance of a clogging in the hopper, which would prevent them from being deposited upon the conveyer chains 81.
90 designates a trip finger see Fig. 5 preferably formed integral with the hammer 27 and normally positioned in close proximity to the guide 24, whereby the projecting wings 55 of the conveyer traveling along the guide way will engage the trip finger 90 to operate the hammer. A suitable trip finger 91 is formed on the arm 39 and projects into the run way also in the path of the conveyer so that the disks 41 are swung back at the proper moment.

In order to provide for starting and stopping the conveyer, the conveyer mechanism see Fig. 2 is thrown into operation by a suitable clutch mechanism mounted on the main shaft 2 preferably consisting of a sleeve 92 secured to the shaft 2 and provided with teeth 93 adapted to engage suitable teeth 94, formed integral with the main driving sprocket 62. As has already been described, this sprocket 62 is mounted on a sliding sleeve 63 having a flange 95 with which a collar 96 engages to shift the sleeve in one direction, the same being held and shifted into the opposite position by means of a spring 97 suitably mounted on the shaft 2 and abutting a stationary part. This collar 96 has secured thereto a plunger 98 guiding a bracket 99 which is part of an extension of the main frame hanger 100. It will be seen that if the collar 96 is shifted to the right as viewed in Fig. 2, that the flange 95 will be engaged thereby and shift the sleeve 63 to compress the spring 97 and remove the sprocket 62 from engagement with the driving clutch teeth 93. In order to bring about this movement a lever 101 is secured to the collar 96 at its connection with the plunger 98, said lever having a pair of cam shaped arms 102 which extend adjacent the bracket 99 and are supported thereon by means of a shelf 103 adapted to be engaged by the hooked end 104, with which the cam arms 102 are provided. The shelf 103 has an extension 105 formed thereon for the purpose of engaging with the cam face 106 of the arms 102. It will be noted that the connection between the lever 101 and the collar 96 is a pivotal one so that the forked member with its cam surfaces may be oscillated when desired to bring the cam face 106 into contact with the extension 105 whereby the plunger 98 is moved inwardly so that the collar 96 is shifted to unclutch the driving mechanism. The trip 18 mounted on the frame 14 is positioned directly beneath the lever 101 so that as this frame 14 is raised the two come into contact and the movement is communicated to the cam lever 102. That portion of the conveyer run way formed by the members 29 and 30, it will be noted, terminates at a point 107 conveniently located so that the seed potatoes may be accurately dropped into the furrow made by the disks 7 and in which the fertilizer has been sifted through the delivery tube 6.
In operation the hopper 38 is filled with the potatoes and the lever 11 is lowered to the position seen in Fig. 1 whereby the disks 7 sink into the earth preparatory to cutting a furrow as the vehicle is started. The covering disk 13 is also lowered at the same time to operative position and thereby the trip 18 is removed from engagement with the lever 101, whereby the same is returned to normal position by means of the spring 97 which shifts at the same time the sleeve 63 carrying the sprocket 62 into mesh with the driving sleeve 92. As soon as the vehicle begins to move the motion of the axle is transmitted to the sprocket 62 and by means of the chain 61 starts the conveyer within the run way. In the meantime the movement of the axle 2 imparts motion to the cam 85 and a vibration of the plate 83 begins and the potatoes are kept constantly moving toward the chain 81, which is also now in operation by reason of the rotation of the sprocket wheel 64 and the bevel gears 69 and 82. The chains 81 direct the seed potatoes to the conveyer chain upon which they are deposited. The potatoes are received by buckets 44 of the conveyer one or two dropping on the fingers 50 of each bucket and are carried upwardly along the incline run way 22 as shown in Fig. 9 in which figure the wings 55 of the impaler are shown engaged by the guide 24 holding the impaler 53 retracted during the upward movement and until a seed potato has reached a point approximately opposite the hammer 27.

As has been before stated, it is important and necessary that but a single potato be discharged at a time and the impaler is adapted for this purpose, since it will be seen that by the mechanism provided it will serve to hold a single potato upon a bucket where one or more potatoes are fed upon the bucket by the chain 81. In order to accomplish this it will be understood that as the conveyer proceeds in its movement the wings 55 on the impaler 53 are engaged by the guide 24, see more particularly Fig. 9, and are consequently held in proper position to engage with the trip 90 of the hammer 27 which throws the same into position, as seen in said Fig. 9, against the tension of the spring 28. The buckets are so positioned that one of the same, as for example the third one in advance of that which carries the wings in engagement with the trip 90, is so situated that the wings 55 of the impaler have been released from the guide 24 when the impaler is in position to be struck by the hammer 27. As soon as the wings 55 have actuated the hammer by passing the trip on the same, the spring 28 forces in the hammer which strikes the impaler and drives the same into a single potato no matter how many potatoes are carried by this bucket. In order to properly hold the potato in position to receive the impaler the disks 41 are in the position seen in full lines in said Fig. 9 and consequently serve as a resilient buffer for the potato. Immediately after the wings release the trip 90 they contact with the trip 91 on the arm which supports the disks 41 and throw out said disks into the position seen in dotted lines in Fig. 9, in order to permit of further movement of the conveyer, since if the disks remain in the position seen in full lines they would crush and otherwise injure the potato. As soon as the wings 55 pass the trip 51 the spring 42 returns the disks 41 to their proper position for holding the potato in the next bucket to receive its proper impaler 53. The segment carrying the impaled potato passes along the top of the hopper and enters the downwardly inclined chute of the run way, at the lower end of which the wings 55 come in contact again, with the guide 24 which has a cam effect to withdraw the impaler from the potato to release it at the proper moment that it may drop from the opening 107 to the ground.

Having thus described my invention, what I claim as new and desire to secure by Letters Patent, is:—

1. In a potato planter, a hopper, a run way adjacent said hopper, a plurality of buckets forming a conveyer in said run way, an impaler on each bucket, means to operate said impaler to maintain a potato on said bucket, means to hold a potato on said bucket during the operation of said impaler, a conveyer in said hopper to deliver potatoes to said buckets and an outlet from said run way adjacent the ground.

2. In a potato planter, a hopper, a run way adjacent thereto, a plurality of buckets forming a conveyer in said run way, an impaler on each bucket, means to operate said impaler to engage and maintain a potato on said bucket, means to release said impaler, a conveyer in said hopper to deliver potatoes to said buckets and an outlet for said run way adjacent the ground.

3. In a potato planter, a hopper, a run way adjacent said hopper, a plurality of buckets forming a conveyer in said run way, an impaler on each bucket, a hammer adapted to operate said impalers successively, means to maintain a potato on said bucket during the operation of said impaler, a conveyer in said hopper to deliver potatoes to said buckets and an outlet from said run way adjacent the ground.

4. In a potato planter, a hopper, a run way adjacent said hopper, a plurality of buckets forming a conveyer on said run way, an impaler on each bucket adapted to engage a potato, a hammer operating said impaler, a yielding support to maintain a potato on said bucket during the operation of said impaler, a conveyer in said hopper to deliver potatoes to said buckets and an outlet from said run way adjacent the ground.

5. In a potato planter, a hopper, a run way adjacent said hopper, a plurality of buckets forming a conveyer in said run way, an impaler on each bucket, a hammer adapted to operate said impaler, a yielding support to maintain a potato in said bucket during the operation of said impaler, means to operate said hammer and support, a conveyer in said hopper to deliver potatoes to said buckets and an outlet for said run way adjacent the ground.

6. In a potato planter, a hopper, a run way adjacent said hopper, a plurality of buckets forming a conveyer in said run way, an impaler on each bucket, a hammer adapted to engage said impaler, a spring holding said hammer in normal position, a lug on said hammer and means on said conveyer to engage said lug to operate said hammer, a conveyer in said hopper to deliver potatoes to said buckets and an outlet from said run way adjacent the ground.

7. In a potato planter, a hopper, a run way adjacent said hopper, a plurality of buckets forming a conveyer in said run way, an impaler on each bucket, a hammer for operating an impaler to engage a potato, means on said run way for disengaging said impaler to release a potato, a conveyer in said hopper to deliver potatoes to said buckets and an outlet from said run way adjacent the ground.

8. In a potato planter, a hopper, a run way adjacent said hopper, a plurality of buckets forming a conveyer in said run way, an impaler slidingly mounted on each bucket, a hammer to operate said impaler to engage a potato, a cam guide to release said impaler, a conveyer in said hopper to deliver potatoes to said buckets, and an outlet from said run way adjacent the ground.

9. In a potato planter, a hopper, a carrier in said hopper, a run way adjacent the end of said carrier, a plurality of buckets forming a conveyer in said run way, an outlet for said run way adjacent the ground, means to vibrate the contents of said hopper and means to actuate said carrier and conveyer.

10. In a potato planter, a run way, a conveyer bucket consisting of a body portion having an opening therein, a plurality of fingers integral with said body portion, guide lugs secured to said body portion, an impaler slidingly mounted in said opening, and means on said impaler coöperating with said run way.

11. In a potato planter, a run way, a conveyer bucket consisting of a body portion having an opening therein, a plurality of fingers integral with said body portion, guide lugs secured to said body portion, an impaler slidingly mounted in said opening, side wings on said impaler to engage said run way, and means to limit the movement of said impaler.

12. In a potato planter, a runway, a conveyer bucket consisting of a body portion having an opening therein, a plurality of fingers integral with said body portion, an impaler slidingly mounted in said opening, wings on said impaler to engage said runway, means to detachably secure said bucket to an adjacent bucket and means to limit the movement of said impaler.

13. In a potato planter, a hopper, a carrier in said hopper, a run-way adjacent the end of said carrier and a plurality of buckets forming a conveyer in said run-way, an outlet for said run-way adjacent the lower portion thereof, and means to actuate said carrier and said conveyer.

14. In a potato planter, a run-way, a conveyer bucket, an impaler slidingly mounted on said conveyer bucket, means for actuating said impaler at the proper time and a support formed with a plurality of projections adapted to interfit with said bucket when said impaler is actuated.

15. In a potato planter, a run-way, a conveyer formed of a plurality of buckets in said run-way, an impaler on each bucket, a support suitably mounted adjacent said conveyer and in the path of movement of said buckets, and means to permit a portion of each bucket to pass through said support.

16. In a potato planter, a run-way, a conveyer bucket having a plurality of fingers, an impaler slidingly mounted in said bucket, means for actuating said impaler, and a support having a plurality of disks interfitting with said fingers, at a predetermined time.

17. In a potato planter, a run-way, a conveyer bucket having a plurality of fingers, an impaler slidingly mounted in said bucket, means for actuating said impaler, a support having a plurality of graded disks interfitting with said fingers at a predetermined time.

ALLEN McWHORTER.

Witnesses:
WM. A. HENDRICKSON,
EZRA M. CARHART.